US012603685B2

(12) United States Patent
Huang et al.

(10) Patent No.: US 12,603,685 B2
(45) Date of Patent: Apr. 14, 2026

(54) TRANSMISSION CONFIGURATION INDICATOR STATE FOR CHANNEL STATE INFORMATION REPORT IN FULL-DUPLEX SYSTEMS

(71) Applicant: QUALCOMM Incorporated, San Diego, CA (US)

(72) Inventors: Min Huang, Beijing (CN); Yu Zhang, San Diego, CA (US); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 514 days.

(21) Appl. No.: 17/996,993

(22) PCT Filed: May 5, 2020

(86) PCT No.: PCT/CN2020/088588
§ 371 (c)(1),
(2) Date: Oct. 24, 2022

(87) PCT Pub. No.: WO2021/223059
PCT Pub. Date: Nov. 11, 2021

(65) Prior Publication Data
US 2023/0179279 A1 Jun. 8, 2023

(51) Int. Cl.
*H04B 7/06* (2006.01)
*H04B 17/318* (2015.01)
(Continued)

(52) U.S. Cl.
CPC ......... *H04B 7/0626* (2013.01); *H04B 17/318* (2015.01); *H04B 17/345* (2015.01); *H04L 5/0051* (2013.01); *H04W 24/08* (2013.01)

(58) Field of Classification Search
CPC .. H04B 7/0626; H04B 17/318; H04B 17/345; H04B 17/309; H04B 7/088; H04L 5/0051; H04W 24/08
See application file for complete search history.

(56) References Cited

U.S. PATENT DOCUMENTS

| | | | |
|---|---|---|---|
| 10,425,215 | B2 | 9/2019 | Lee et al. |
| 2013/0196675 | A1 | 8/2013 | Xiao et al. |

(Continued)

FOREIGN PATENT DOCUMENTS

| | | |
|---|---|---|
| CN | 110326243 A | 10/2019 |
| WO | WO-2013145787 A1 | 10/2013 |
| WO | WO-2019161181 | 8/2019 |

OTHER PUBLICATIONS

International Search Report and Written Opinion—PCT/CN2020/088588—ISA/EPO—Feb. 4, 2021.
(Continued)

*Primary Examiner* — Ivan O Latorre
(74) *Attorney, Agent, or Firm* — Norton Rose Fulbright US LLP

(57) ABSTRACT

An improved transmission configuration indicator (TCI) state for channel state information (CSI) reporting is disclosed for full-duplex systems. In such systems, a potentially victim user equipment (UE) may receive a CSI report configuration message including at least a TCI state and a quasi-colocation (QCL) type indicator. The TCI state includes identification of at least a downlink reference signal resource and an uplink reference signal resource, while the QCL type indicator indicates a spatial relationship between the downlink and uplink reference signals. The UE may then determine a receive beam for receipt of a downlink reference signal, wherein the receive beam is determined based on the QCL type indicator. The UE generates and transmits a CSI report based on the receipt of the downlink reference signal (Continued)

using the determined receive beam and an interference measurement of the uplink reference signal resource.

27 Claims, 8 Drawing Sheets

(51) Int. Cl.

| | |
|---|---|
| *H04B 17/345* | (2015.01) |
| *H04L 5/00* | (2006.01) |
| *H04W 24/08* | (2009.01) |

(56) References Cited

U.S. PATENT DOCUMENTS

| | | | | |
|---|---|---|---|---|
| 2013/0258954 | A1 | 10/2013 | Khoshnevis et al. | |
| 2018/0351630 | A1 | 12/2018 | Nilsson et al. | |
| 2019/0052333 | A1* | 2/2019 | Xu | H04L 1/0041 |
| 2020/0059290 | A1 | 2/2020 | Pan et al. | |
| 2020/0106488 | A1* | 4/2020 | Akoum | H04W 52/365 |
| 2021/0250797 | A1* | 8/2021 | Karjalainen | H04L 1/0026 |
| 2022/0030522 | A1* | 1/2022 | Vejlgaard | H04W 52/245 |
| 2022/0131668 | A1* | 4/2022 | Matsumura | H04L 5/0023 |
| 2022/0201502 | A1* | 6/2022 | Kang | H04B 7/08 |
| 2022/0279445 | A1* | 9/2022 | Shrivastava | H04W 52/0274 |

OTHER PUBLICATIONS

LG Electronics: "Discussion on interference measurement for NR", R1-1704881, 3GPP TSG RAN WG1 Meeting #88bis, Apr. 7, 2017 (Apr. 7, 2017), 4 Pages, the whole document.

Mediatek Inc: "Discussion on RRM Requirements for LI-SINR", R4-2000935, 3GPP TSG-RAN WG4 Meeting #94, Mar. 6, 2020 (Mar. 6, 2020), 5 Pages, the whole document.

OPPO: "Enhancements on Multi-TRP and Multi-Panel Transmission", 3GPP Draft, 3GPP TSG RAN WG1 Meeting #98bis, R1-1910116, 3rd Generation Partnership Project (3GPP), Mobile Competence Centre, 650, Route Des Lucioles, F-06921, Sophia-Antipolis Cedex, France, vol. RAN WG1, No. Chongqing, China; Oct. 14, 2019-Oct. 20, 2019, Oct. 4, 2019 (Oct. 4, 2019), XP051808070, 13 pages, p. 6-p. 7.

Li H., et al., "CSI-RS Based CQI Measurement", Guangdong Communication Technology, Dec. 20, 2016, Nov. 15, 2016, 15 pages.

Supplementary European Search Report—EP20934300—Search Authority—Munich—Jan. 8, 2024 (204125EP).

\* cited by examiner

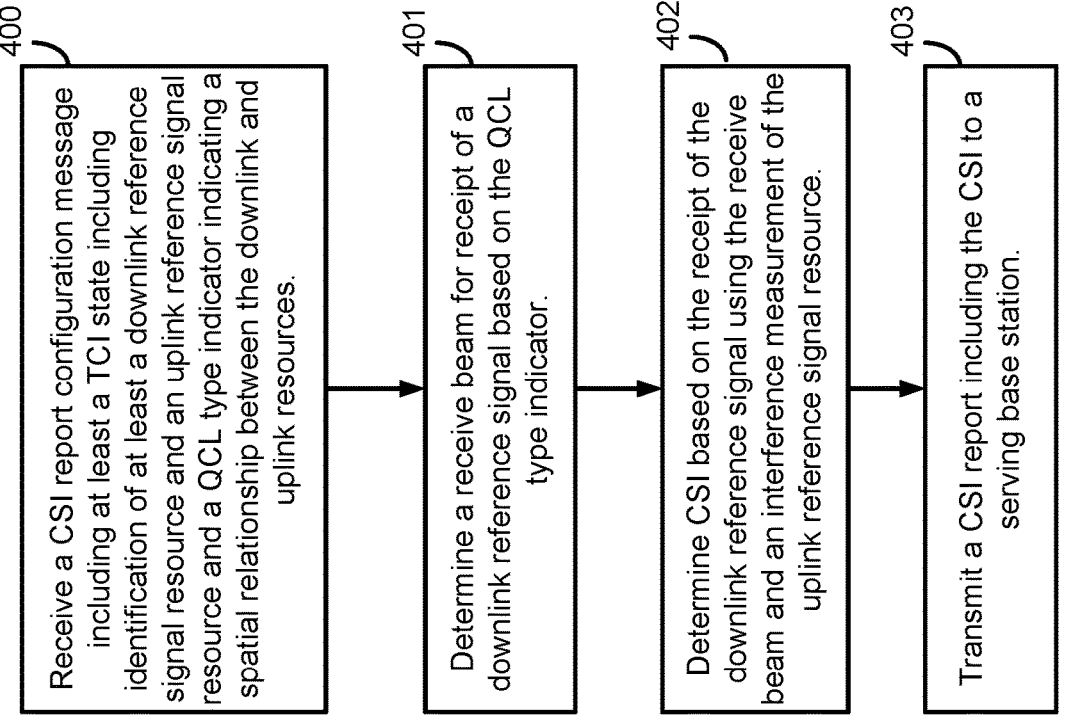

400 Receive a CSI report configuration message including at least a TCI state including identification of at least a downlink reference signal resource and an uplink reference signal resource and a QCL type indicator indicating a spatial relationship between the downlink and uplink resources.

401 Determine a receive beam for receipt of a downlink reference signal based on the QCL type indicator.

402 Determine CSI based on the receipt of the downlink reference signal using the receive beam and an interference measurement of the uplink reference signal resource.

403 Transmit a CSI report including the CSI to a serving base station.

*FIG. 4*

TRANSMISSION CONFIGURATION INDICATOR STATE FOR CHANNEL STATE INFORMATION REPORT IN FULL-DUPLEX SYSTEMS

CROSS-REFERENCE TO RELATED APPLICATIONS

This application claims the benefit of International Patent Application No. PCT/CN2020/088588, entitled, "IMPROVED TRANSMISSION CONFIGURATION INDICATOR STATE FOR CHANNEL STATE INFORMATION REPORT IN FULL-DUPLEX SYSTEM," filed on May 5, 2020, which is expressly incorporated by reference herein in its entirety.

BACKGROUND

Field

Aspects of the present disclosure relate generally to wireless communication systems, and more particularly, to improved transmission configuration indicator (TCI) states for channel state information (CSI) reporting in full-duplex systems.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, at a user equipment (UE), a channel state information (CSI) report configuration message including at least a transmission configuration indicator (TCI) state and a quasi-colocation (QCL) type indicator, wherein the TCI state includes identification of at least a downlink reference signal resource and an uplink reference signal resource and the QCL type indicator indicates a spatial relationship between the downlink reference signal resource and the uplink reference signal resource, determining, by the UE, a receive beam for receipt of a downlink reference signal via the downlink reference signal resource, wherein the receive beam is determined based on the QCL type indicator, determining, by the UE, CSI based on the receipt of the downlink reference signal using the receive beam and an interference measurement of the uplink reference signal resource, and transmitting, by the UE, a CSI report including the CSI to a serving base station.

In an additional aspect of the disclosure, an apparatus configured for wireless communication includes means for receiving, at a UE, a CSI report configuration message including at least a TCI state and a QCL type indicator, wherein the TCI state includes identification of at least a downlink reference signal resource and an uplink reference signal resource and the QCL type indicator indicates a spatial relationship between the downlink reference signal resource and the uplink reference signal resource, means for determining, by the UE, a receive beam for receipt of a downlink reference signal via the downlink reference signal resource, wherein the receive beam is determined based on the QCL type indicator, means for determining, by the UE, CSI based on the receipt of the downlink reference signal using the receive beam and an interference measurement of the uplink reference signal resource, and means for transmitting, by the UE, a CSI report including the CSI to a serving base station.

In an additional aspect of the disclosure, a non-transitory computer-readable medium having program code recorded thereon. The program code further includes code to receive, at a UE, a CSI report configuration message including at least a TCI state and a QCL type indicator, wherein the TCI state includes identification of at least a downlink reference signal resource and an uplink reference signal resource and the QCL type indicator indicates a spatial relationship between the downlink reference signal resource and the uplink reference signal resource, code to determine, by the UE, a receive beam for receipt of a downlink reference signal via the downlink reference signal resource, wherein the receive beam is determined based on the QCL type indicator, code to determine, by the UE, CSI based on the receipt of the downlink reference signal using the receive beam and an interference measurement of the uplink reference signal resource, and code to transmit, by the UE, a CSI report including the CSI to a serving base station.

In an additional aspect of the disclosure, an apparatus configured for wireless communication is disclosed. The apparatus includes at least one processor, and a memory coupled to the processor. The processor is configured to receive, at a UE, a CSI report configuration message including at least a TCI state and a QCL type indicator, wherein the TCI state includes identification of at least a downlink reference signal resource and an uplink reference signal resource and the QCL type indicator indicates a spatial relationship between the downlink reference signal resource and the uplink reference signal resource, to determine, by the UE, a receive beam for receipt of a downlink reference signal via the downlink reference signal resource, wherein the receive beam is determined based on the QCL type indicator, to determine, by the UE, CSI based on the receipt of the downlink reference signal using the receive beam and an interference measurement of the uplink reference signal resource, and to transmit, by the UE, a CSI report including the CSI to a serving base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4 is a block diagram illustrating example blocks executed to implement one aspect of the present disclosure.

Figure 1:
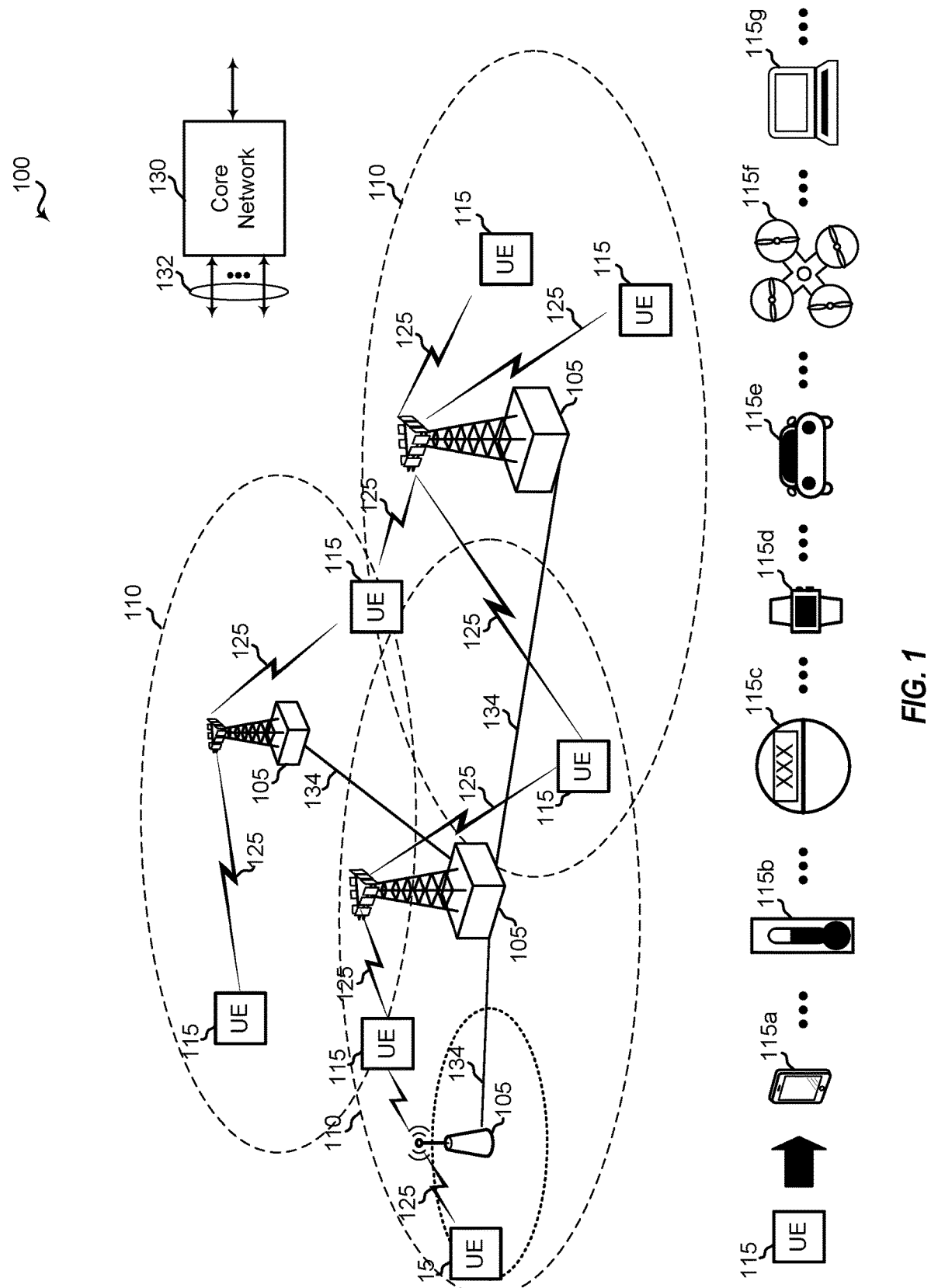
FIG. 1 is a block diagram illustrating details of a wireless communication system.

The Appendix provides further details regarding various embodiments of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports an improved TCI state that identifies both downlink and uplink reference signal resources and a new QCL type that defines a spatial relationship between the two in accordance with aspects of the present disclosure. The new TCI state and QCL type allows a UE to determine a receive beam that accounts for both a downlink reference signal resource identifying the data transmission and an uplink reference signal resource identifying the interfering transmission. By accounting for both the quality of the data channel and the influence of the interference channel, the UE may select a receive beam that represents a highest signal-to-interference plus noise ratio (SINR) of the candidate beams considering the interference. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115a), a personal digital assistant (PDA), a wearable device (UE 115d), a tablet computer, a laptop computer (UE 115g), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115e and UE 115f), meters (UE 115b and UE 115c), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
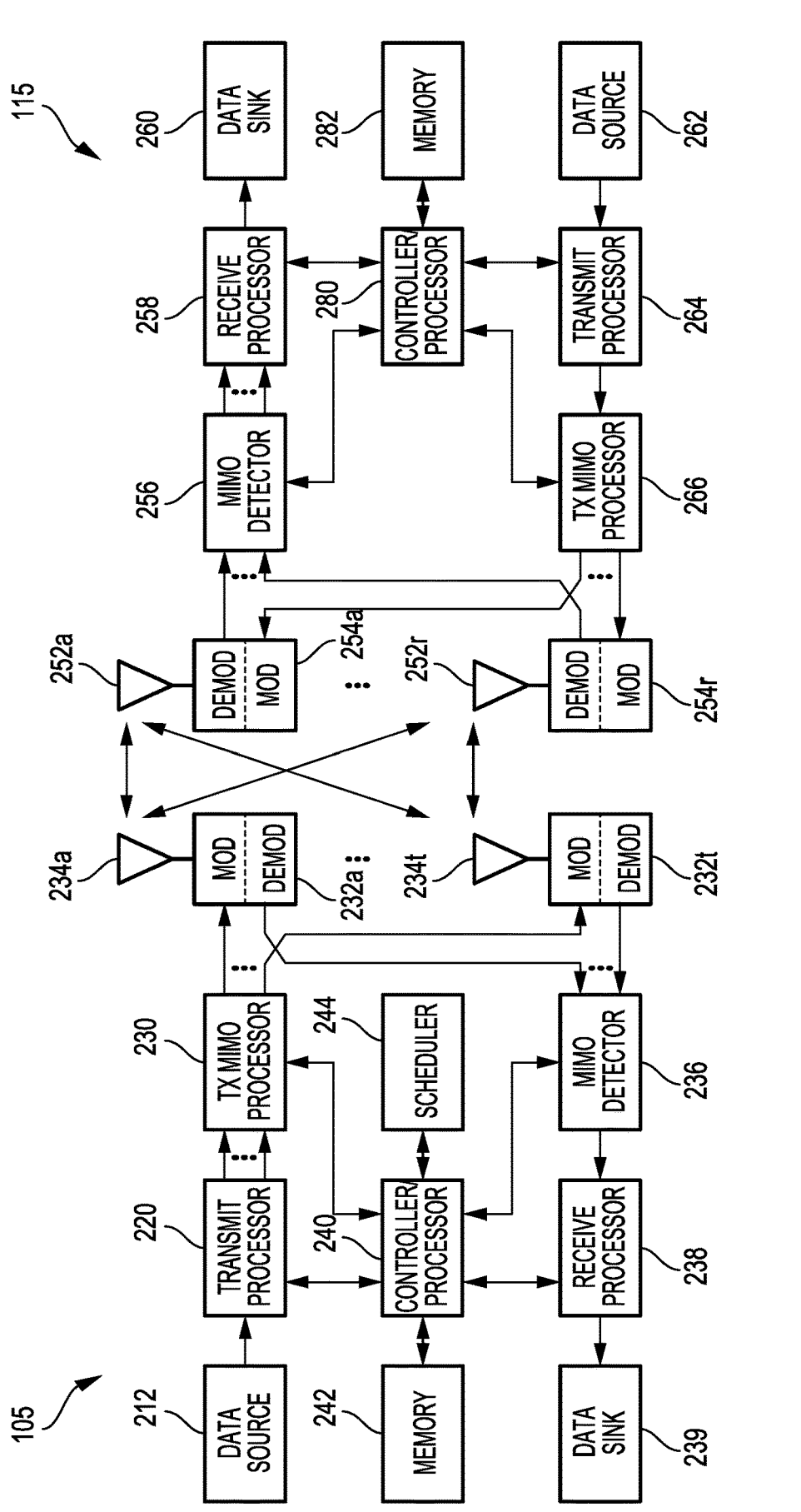
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the base station 105 and the UE 115, respectively. A scheduler 244 may schedule UEs for data transmission on the downlink and/or uplink.

5G wireless networks are expected to provide an ultra-high data rate as well as support a wide scope of application scenarios. Wireless full duplex (FD) communications technology is an emerging technique and may be capable of increasing the link capacity. The main idea behind wireless full-duplex is to enable radio network nodes to transmit and receive simultaneously via the same time-frequency resource or the same time resource. A full-duplex network node, such as a base station in the cellular network, can communicate simultaneously in uplink and downlink with other half-duplex terminals using the same radio resources. Another typical wireless full-duplex application scenario includes a relay node (e.g. an integrated access and backhaul (IAB) node) can communicate simultaneously with the anchor node and the mobile terminal in a one-hop scenario, or with the other two relay nodes in a multi-hop scenario. It is expected that, by increasing the capacity of each single-link, full duplexing can significantly increase the overall system throughput in various different applications in wireless communication networks and also reduce the transfer latency for time critical services.

One element to enabling full-duplex transmissions is the capability of canceling strong self-interference from downlink-to-uplink. Current full-duplex radio designs have the capability to suppress such self-interference by combining the technologies of beamforming, analog cancellation, digital cancellation and antenna cancellation.

Figure 3A:
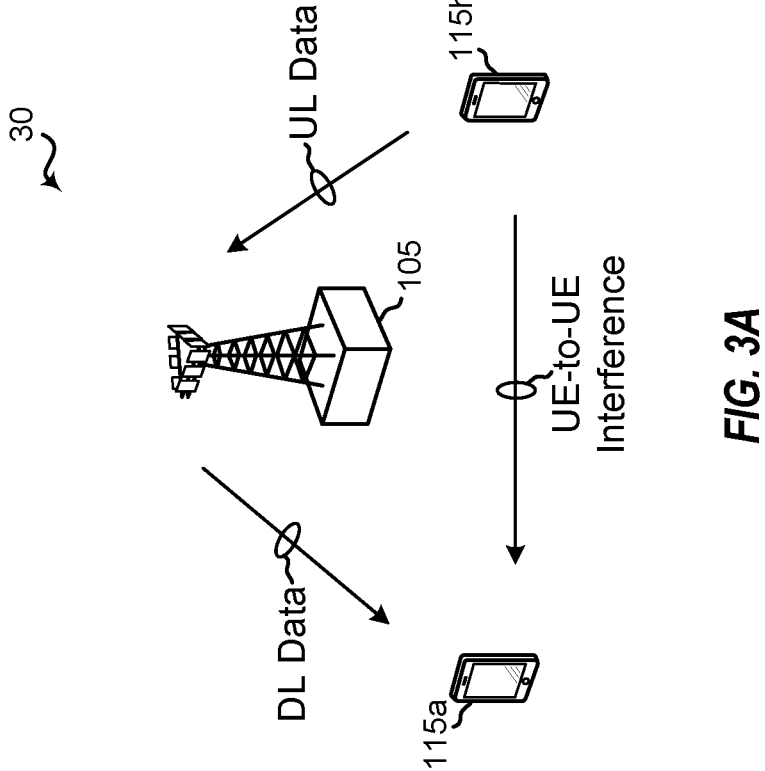
FIGS. 3A-3C are block diagrams illustrating a typical portion of a wireless communication network configured using a legacy full-duplex operations.

FIG. 3A is a block diagram illustrating a typical portion of a wireless communication network 30 configured using a legacy full-duplex configuration. A full-duplex network node, such as base station 105 in wireless communication network 30, can communicate simultaneously in uplink and downlink with two user equipment (UE), UE 115a and UE 115h, using the same radio resources. With the legacy full-duplex capabilities, the downlink data signals received by UE 115a and the uplink data signals transmitted by UE 115h can coexist at the same radio spectrum simultaneously in a cell, such as the portion of wireless communication network 30 illustrated in FIG. 3A. In legacy full-duplex systems, the uplink data signals from UE 115h would generate UE-to-UE interference for UE 115a attempting to receive the downlink data signals from base station 105.

Figures 3B, 3C:
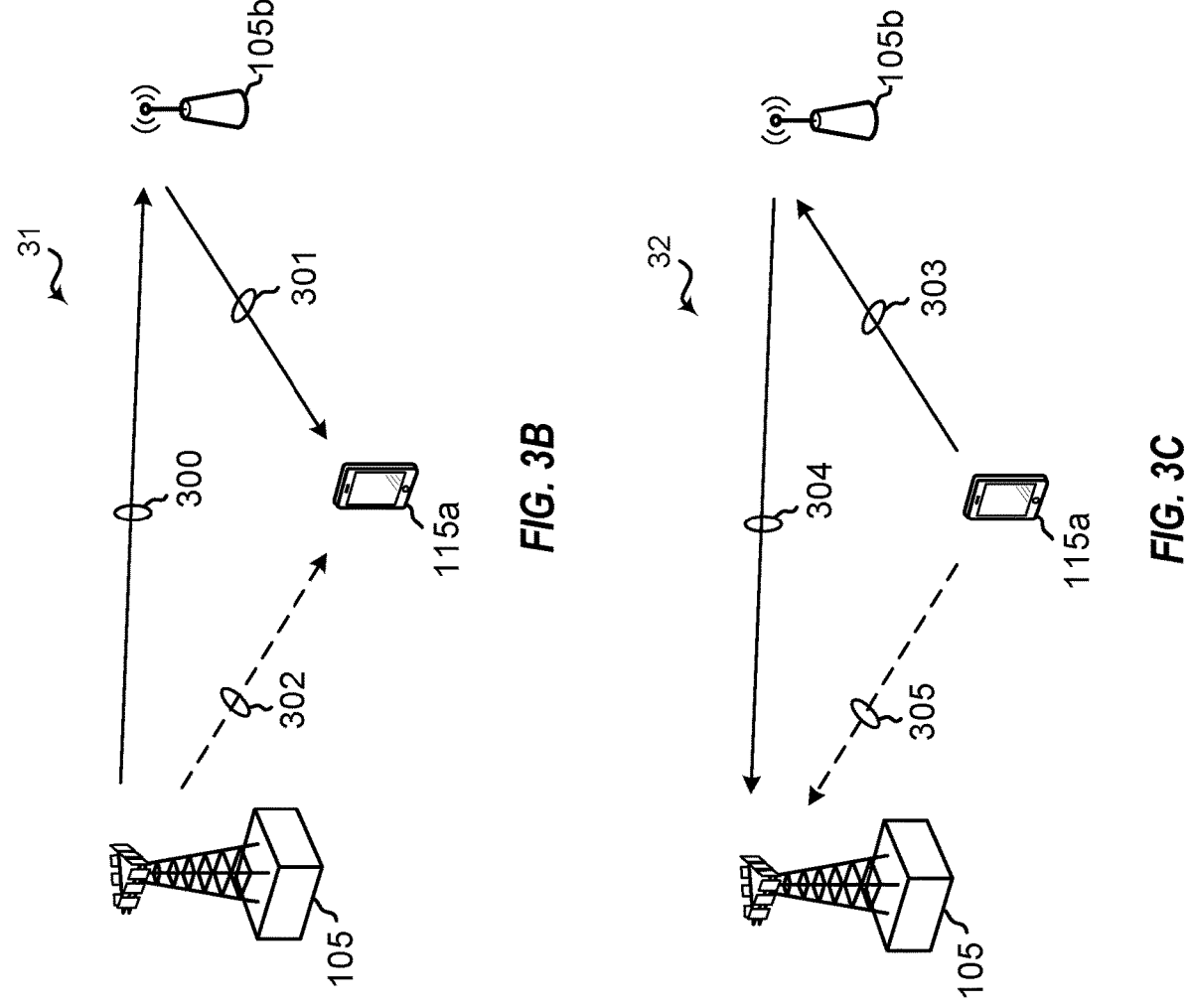

FIGS. 3B and 3C are block diagrams illustrating portions of wireless communications networks 31 and 32 including relay node 105b and base station 105 wherein at least base station 105 and relay node 105 may operate with full-duplex capabilities. Wireless communication networks 31 and 32 illustrate systems of IAB nodes having full-duplex capabilities. One IAB node, relay node 105b, relays data between UE 115a and base station 105, which may be referred to as the IAB donor node. Wireless network 31 illustrates downlink data transmitted from base station 105 (IAB donor node) to relay node 105b, via transmission 300, and from relay node 105b to UE 115a, via transmission 301, while wireless communication network 32 illustrates uplink data transmitted from UE 115 to relay node 105b, via transmission 303, and from relay node 105b to base station 105 (IAB donor node), via transmission 304.

With full-duplex capabilities, the IAB node, relay node 105b, can receive the downlink data from the IAB donor, base station 105, via transmission 300, and transmit the downlink data via transmission 301 to UE 115a, as depicted in wireless communication network 31, or the IAB node, relay node 105b, can receive uplink data via transmission 303 from UE 115a and transmit the uplink data to IAB donor, base station 105, via transmission 304 by using the same time-frequency radio resource in wireless communication network 32. Within the full-duplex operations, the Uu interface, such as, between UE 115 and the radio access network (RAN) at the IAB node, relay node 105b, would experience interference from the originating transmissions. For example, transmission of the downlink data at transmission 300 on the backhaul link would cause interference 302 on the access link of transmission 301 between relay node 105b and UE 115a. Similarly, transmission of the uplink data at transmission 303 to relay node 105b on the access link would cause interference 305 on the backhaul link of transmission 304 between relay node 105b and base station 105, the IAB donor. Such interference (e.g., interference 302 and 305) would cause data reception performance deterioration within wireless communication networks 31 and 32.

It should be noted that UE 115a can be configured as another IAB node. In such cases, the backhaul link between the IAB donor, base station 105, and the IAB node, relay node 105b, may be referred to as the parent link, while the access link between that IAB node, relay node 105b, and the other IAB node, UE 115a, may be referred to as the child link. As such, the parent link (between base station 105 and relay node 105b) and the child link (between relay node 105b and UE 115a) may interfere each other (e.g., interference 302 and 305).

Referring back to FIG. 3A, wireless communication network 30 also represents a cell that has activated full-duplex capabilities. In such wireless communication network 30, the downlink UE, UE 115a, may suffer from co-channel interference from the paired uplink UE, UE 115h (e.g., UE-to-UE interference). The interference strength may depend on the distance between these two UEs and also may depend on the uplink transmission beamforming by the uplink UE, UE 115h. If the downlink UE, UE 115a, has more than one receive antenna and performs coherent antenna reception, the interference strength also may depend on the receive beamforming and the spatial direction of the interference signal.

3GPP Release-16 (NR Rel-16) introduced a feature called Cross-Link Interference (CLI) handling that provides for a UE in one cell to measure the interference from the UEs in other cells. However, because of the measurement details for such CLI handling, it cannot generally be used in a Layer-1 CSI report. The CLI technique includes the network configuring a set of sounding reference signal (SRS) resources for both the victim UE and the aggressor UE. Within these SRS resources, the victim UE would be configured to measure the strength of the SRS signal transmitted by the aggressor UEs in neighboring cells. Because these two UEs are located in two difference cells, considering various backhaul data rate and latency restrictions, the victim UE can report the Layer-3 measurement results, such as the values of SRS-reference signal receive power (RSRP) or CLI-received signal strength indicator (RSSI), which are calculated based on the results of long-term measurements (e.g., in a duration that may be in the tens or even hundreds of slots). To enable such inter-cell SRS measurement, the information on SRS configuration should be transferred via the backhaul between the base stations of the victim cell and the aggressor cell. Again, considering the restrictions of backhaul transfer latency, such information transfer would likely adopt either a static or semi-static mode. Thus, correspondingly, the SRS measurements could be configured in a static or semi-static pattern. Therefore, the legacy CLI techniques would be used for long-term interference management, such as by allocating non-overlapping radio resources for the aggressor UE and victim UE, which may suffer system capacity compared with radio resource reuse.

According to current NR standards, a UE can be configured with a number of transmission configuration indicator (TCI) state configurations that may be used to decode downlink transmissions (e.g., PDSCH, etc.). Each TCI state contains parameters for configuring a quasi-colocation (QCL) assumption between one or two downlink reference signals and the DMRS ports of the downlink data transmission, the DMRS port of the downlink control transmission, or the CSI-RS port(s) of a CSI-RS resource. The downlink reference signals can be configured as a synchronization signal block (SSB) or a CSI-RS. The QCL assumption is configured by a first higher layer parameter (e.g., RRC signaling) for the first downlink reference signal and a second higher layer parameter (e.g., RRC signaling) for the second downlink reference signal, if configured.

The current QCL types corresponding to each downlink reference signal are given via a QCL indicator in a higher layer parameter and may take one of the following values: QCL-TypeA (Doppler shift, Doppler spread, average delay, delay spread); QCL-TypeB (Doppler shift, Doppler spread); QCL-TypeC (Doppler shift, average delay); QCL-TypeD (Spatial Rx parameter).

Further according to current NR standards, when a base station sends a CSI report configuration message to a UE, it may indicate a TCI state associated with the configured CSI-RS resource(s). For periodic CSI-RS or semi-persistent CSI-RS reporting, a TCI state parameter is configured for the non-zero-power CSI-RS (NZP-CSI-RS) resource in Layer-3 signaling (e.g., RRC signaling). For aperiodic CSI-RS reporting, a list of trigger states may also be configured for the NZP-CSI-RS resource in Layer-3 signaling. Each such trigger state has an associated TCI state parameter. The base station can then indicate one of the trigger states to the UE in a downlink control information (DCI) (e.g., DCI format 0-1, 0-2, etc.). The UE may then receive the aperiodic CSI-RS based on its associated TCI state parameter, e.g., using a receive beam indicated by the QCL assumption associated with the TCI state therein, if the QCL type is QCL-Type D. Because DCI signaling is a dynamic control signal and has a much shorter transmission and processing latency than Layer-3 signaling, the base station can configure the UE with multiple aperiodic CSI reports to measure CSI-RS with different TCI state parameters. This procedure may correspond to the scenarios where the UE is requested to report CSI with various signal parameters, such as where the desired signal comes from different transmission-reception points (TRPs) of the base station.

It should be noted that a trigger state may also contain configuration information for interference measurement, such as CSI-interference measurement (CSI-IM) information and NZP-CSI-RS for interference information. However, this interference measurement information is used to indicate the resources for measurement of interference after the receive beam is determined, rather than to determine the receive beam. The UE is expected to receive the downlink reference signal (e.g., SSB, CSI-RS) based on the associated TCI state. For example, when the QCL type indicated in the TCI state is QCL-Type D, the UE may use the receive beam identified by the indicated QCL assumption to receive the downlink reference signal.

According to the legacy standard, when a UE determines the beam to receive a downlink reference signal (e.g., SSB, CSI-RS), it takes the beam that is used to receive the downlink reference signal of the TCI state, as indicated in the CSI report configuration message. The CSI report configuration message may be communicated to the UE via one or a combination of RRC-layer signaling, a medium access control-control element (MAC CE), and/or a DCI. In this case, the receive beam is determined by the spatial direction of the data signal, regardless of any potential or existing interference. However, in full-duplex capable networks, the downlink UE (e.g., the victim UE) may observe the interference from the uplink UE (e.g., the aggressor UE) in the form of UE-to-UE interference or co-channel interference. When the downlink UE (e.g., the victim UE) is paired with different uplink UEs, the interference may further come from different directions, and, thus, with the same receive beam, the downlink UE (e.g., the victim UE) may suffer from different interference strengths. Therefore, in full-duplex implementations, if the base station informs the downlink UE (e.g., victim UE) to report CSI (e.g., rank indicator (RI)/precoding matrix indicator (PMI)/channel quality indicator (CQI)) based on the legacy TCI state information, the UE would determine the receive beam based on the downlink reference signal in the indicated QCL information, e.g., a receive beam that can maximize the beamforming gain of that downlink reference signal, without consideration of potentially interfering signals. Because this receive beam does not take this interference into account, the downlink reference signal maybe received with a higher UE-to-UE interference strength and a low receive signal-to-interference plus noise ratio (SINR). Consequently, the downlink UE (e.g., the victim UE) would report a CSI having a low spectrum efficiency, which would negatively impact the UE data rate and overall cell throughput. In consideration of the foregoing, the various aspects of the present disclosure are directed to an improved TCI state that identifies both downlink and uplink reference signal resources, and a new QCL type that defines a spatial relationship between the two.

Figure 7:
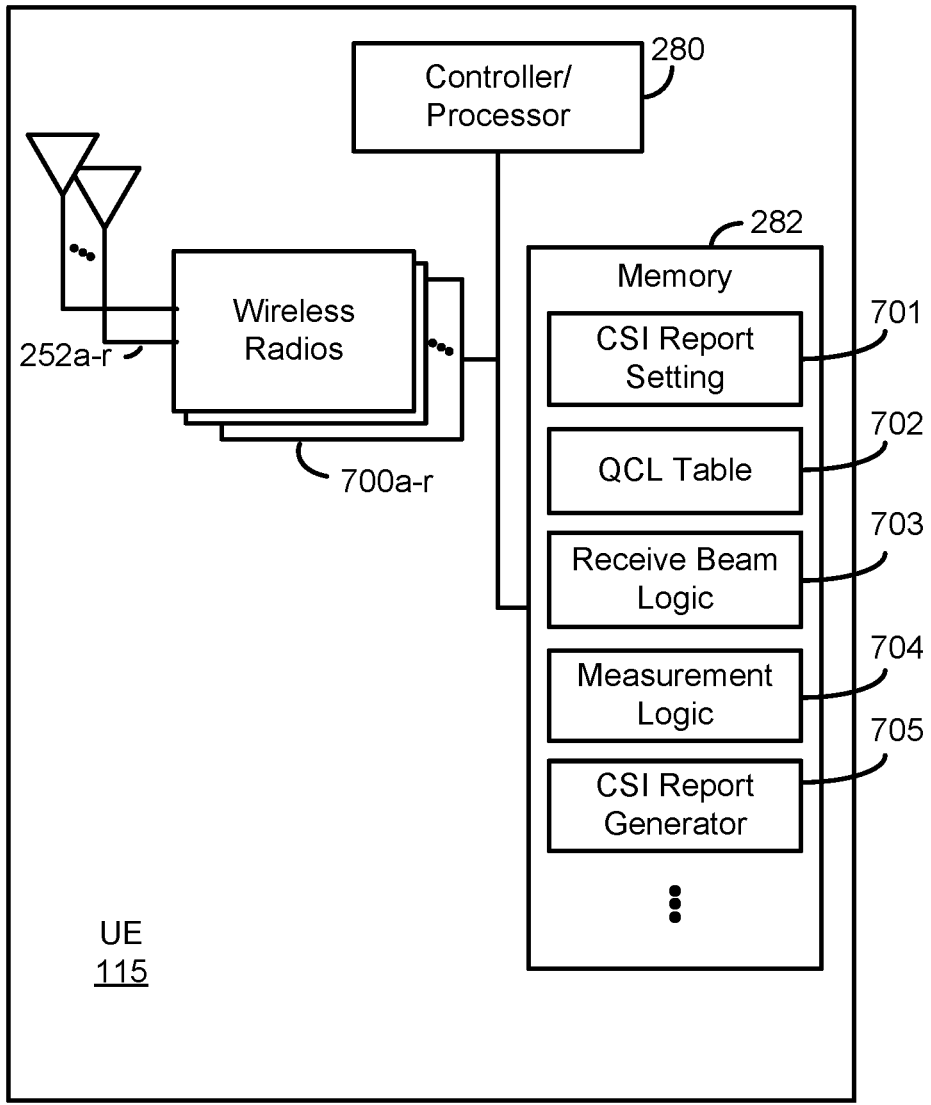
FIG. 7 is a block diagram illustrating a UE configured according to one aspect of the present disclosure.

FIG. 4 is a block diagram illustrating example blocks executed to implement one aspect of the present disclosure. The example blocks will also be described with respect to UE 115 as illustrated in FIGS. 2 and 7. FIG. 7 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 700a-r and antennas 252a-r. Wireless radios 700a-r includes various components and hardware, as illustrated in FIG. 2 for UE 115, including modulator/demodulators 254a-r, MIMO detector 256, receive processor 258, transmit processor 264, and TX MIMO processor 266.

At block 400, a UE receives a CSI report configuration message including at least a TCI state and a QCL type indicator, wherein the TCI state includes identification of at least a downlink reference signal resource and an uplink reference signal resource and the QCL type indicator indicates a spatial relationship between the downlink reference signal resource and the uplink reference signal resource. A UE, such as UE 115, receives the CSI report setting configuration message from a base station via antennas 252a-r and wireless radios 700a-r. The CSI report setting configuration message may be signaled from the base station via one or a combination of RRC signaling, medium access control control elements (MAC CEs), and downlink control information (DCI) messages, depending on whether the CSI reporting is configured to be periodic, aperiodic, or semi-persistent. The CSI report setting includes the setting configuration for the CSI reporting for UE 115. The CSI report setting configuration configures the type of CSI report for UE 115. The type of CSI report may include configuration of the resource and type of measurement to be performed, such as a non-zero power CSI-reference signal (NZP CSI-RS) configuration for channel measurement, a NZP CSI-RS configuration for interference measurement, or a CSI-IM configuration for interference measurement. The type configuration may also configured whether the CSI report is to be periodic, semi-persistent, or aperiodic. This resource and report type configuration information may then be stored in memory 282 at CSI report setting 601.

The CSI report configuration message also includes at least one TCI state and a QCL type indicator. The TCI state may be used by UE 115 to identify the QCL assumption in QCL table 702, stored in memory 282. UE 115 uses the TCI state ID to index the associated QCL assumption in QCL table 702. According to the aspects of the present disclosure, the TCI state further identifies a downlink reference signal resource and an uplink reference signal resource, while the QCL type identifies a spatial relationship between the downlink and uplink reference signal resources.

At block 401, the UE determines a receive beam for receipt of a downlink reference signal via the downlink reference signal resource, wherein the receive beam is determined based on the QCL type indicator. UE 115, under control of controller/processor 280, executes receive beam logic 703. The functionality enabled by executing the steps and instructions of code of receive beam logic (referred to herein as the "execution environment" of receive beam logic 703) allow UE 115 to select a receive beam for receiving the downlink and uplink reference signals. UE 115, under control of controller/processor 280, further executes measurement logic 704, in memory 282. The execution environment of measurement logic 704 provides UE 115 with the capability to measure various properties of signals, channels, and the like. Within the execution environment of receive beam logic 703 and measurement logic 704, UE 115 sweeps each of the candidate receive beams to measure the respective signal power of the data channel of the downlink reference signal (e.g., SSB, CSI-RS) at the downlink reference signal resource. UE 115 also sweeps the candidate receive beams to measure the respective signal power of the interference channel of the uplink reference signal (e.g., SRS, DMRS, PTRS) at the uplink reference signal resource. Using the measured data channel power and the interference channel power, UE 115 determines the candidate receive beam that results in the highest SINR.

At block 402, the UE determines CSI based on the receipt of the downlink reference signal using the receive beam and an interference measurement of the uplink reference signal resource. Within the execution environment of measurement logic 704, UE 115 measures the appropriate CSI parameters (RI, PMI, CQI) for reporting to the serving base station. The CSI parameters are measured on the data channel on which the downlink reference signal was received. The CSI parameters may further take into account the interference observed from the interference channel of the uplink reference signal.

At block 403, the UE transmits a CSI report including the CSI to a serving base station. UE 115, under control of controller/processor 280, executes CSI report generator 705. The execution environment of CSI report generator 705 provides UE 115 with the functionality of preparing the CSI report for the measured CSI parameters. Upon generating the CSI report, UE 115 transmits the CSI report to the serving base station via wireless radios 700a-r and antennas 252a-r.

In the various operations implementing aspects of the present disclosure, a base station indicates the TCI state to the UE in the CSI report configuration message, where the TCI state comprises of at least a downlink reference signal resource and an uplink reference signal resource. This TCI state contains a new-type QCL relationship. The new QCL type, QCL Type-E (Spatial Rx parameter), defines the spatial receive beam direction should maximize the SINR, where the signal power is based on the reception of the downlink reference signal and the interference power is based on the reception of the uplink reference signal. The UE would determine a receive beam based on the new-type QCL relationship in the TCI state. The UE then determines CSI based on receiving the CSI-RS and measuring UE-to-UE interference in full-duplex by using the determined receive beam. The UE then reports the determined CSI to base station.

Figure 5:
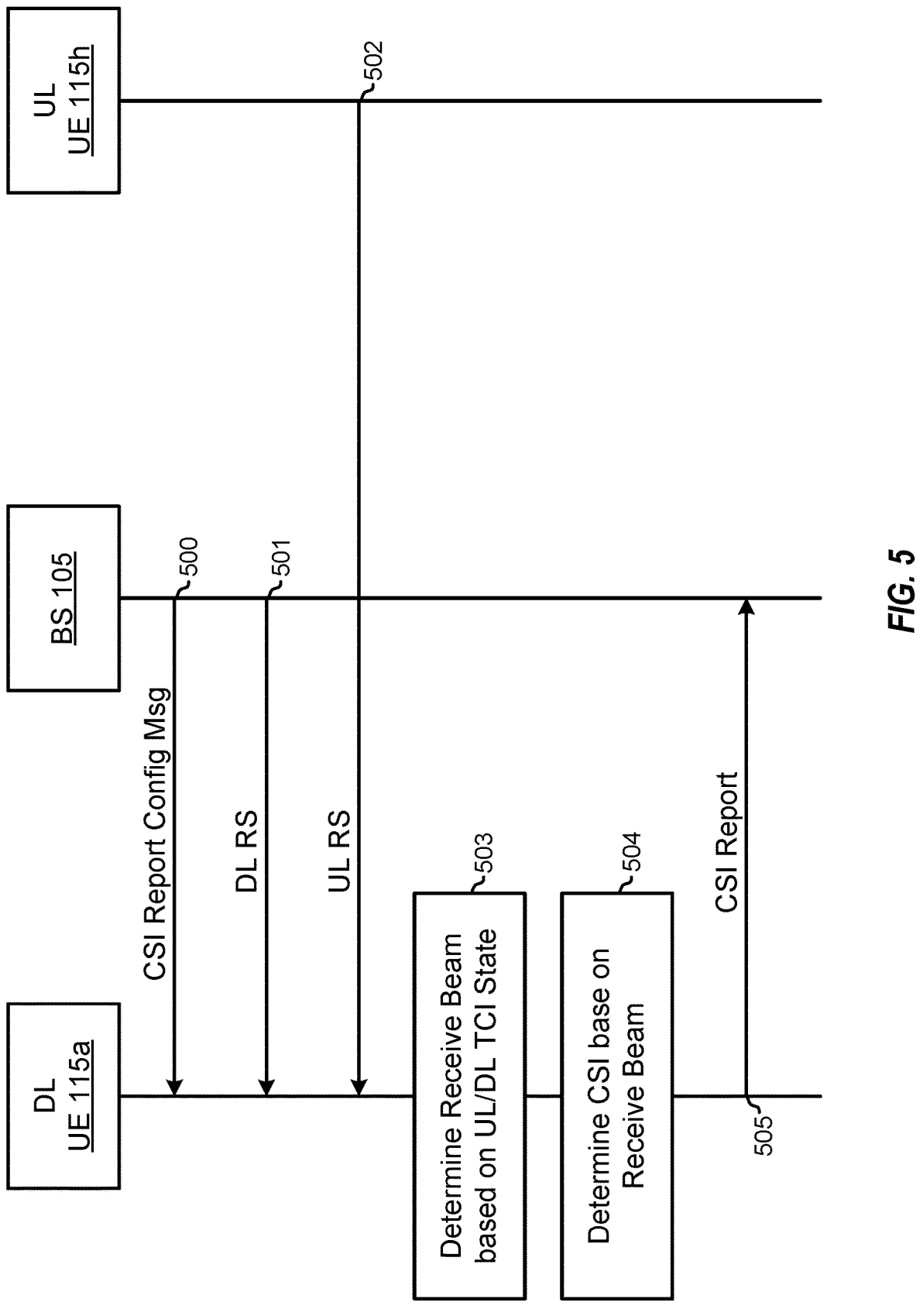
FIG. 5 is a call flow diagram between a base station and a downlink UE and an uplink UE operating with full-duplex according to one aspect of the present disclosure.

FIG. 5 is a call flow diagram between base station 105 and UEs 115a (the downlink UE) and 115h (the uplink UE) operating with full-duplex according to one aspect of the present disclosure. At 500, base station 105 transmits the CSI report configuration message to the downlink/victim UE, UE 115a. The CSI report configuration message would include the new TCI state, which is associated with the new QCL type (e.g., QCL-Type E). The new TCI state configures UE 115a to determine the receive beam based on both a downlink reference signal resource and an uplink reference signal resource. The new QCL type provides the spatial QCL assumption that defines the spatial relationship between the downlink and uplink reference signal resources.

The CSI report configuration message may be transferred from base station 105 to UE 115a using a combination of Layer-3 (e.g., RRC layer), MAC CE, or DCI signaling. The combination of different transmission mechanisms may depend on whether the CSI reporting is configured to be periodic, semi-persistent, or a periodic. Where base station 105 configures UE 115a for periodic or semi-persistent CSI reporting, base station 105 would send the CSI report configuration messaging to UE 115a via RRC-layer signaling, wherein the new TCI state, associated with the new QCL type, is contained. Specifically, the QCL assumption would be associated with a periodic, semi-persistent downlink, or aperiodic reference signal resource (e.g., SSB, CSI-RS resource) and a periodic, semi-persistent, or aperiodic uplink reference signal (e.g., SRS, demodulation reference signal (DMRS), or phase tracking reference signal (PTRS) resource).

For semi-persistent and aperiodic CSI reporting, the Layer-3 CSI reporting configuration includes configuration of multiple available triggers states (e.g., up to 128 trigger states). Each trigger state may be associated with up to a sub-set of report settings (e.g., up to 16 report settings), which are linked through a CSI report configuration identifier (ID) configuring a downlink reference signal resource set. Each downlink reference signal resource set includes multiple downlink reference signal resources. At least one TCI state may be indicated for each such downlink reference signal resource in the resource set, which may be indicated as part of the trigger state configuration. The new TCI state, which is associated with the new QCL type, also defines corresponding uplink reference signal resources for consideration of interference.

In the semi-persistent and aperiodic CSI reporting schemes, base station 105 further transmits a MAC-CE as a part of the CSI report configuration messaging. The MAC-CE activates a subset of the total number of available triggers states configured in the Layer-3 messaging. For semi-persistent CSI reporting, UE 115a may select one of the activated trigger states based on the MAC-CE or base station 105 may further provide a selection via DCI, which selects the trigger state for UE 115a. With this selected trigger state, UE 115a identifies the new TCI state which configures the downlink and uplink reference signal resource where the associated new QCL type defines the spatial relationship between the two reference signals.

When base station 105 configures aperiodic CSI reporting, base station 105 sends a DCI aperiodic CSI report configuration message to UE 115a identifying the TCI state associated with the new QCL type. Specifically, the QCL assumption may be associated with a periodic, semi-persistent, or aperiodic downlink reference signal resource (e.g., SSB, CSI-RS resource) and an aperiodic uplink reference signal (e.g., SRS, DMRS, PTRS resource).

At 501, base station 105 transmits the downlink reference signal identified for the downlink reference signal resource in the CSI report configuration message. In a full-duplex capable cell, such as the cell in which base station 105 and UE 115a are located, the uplink reference signal identified in the new TCI state may be transmitted by another UE, such as UE 115h. At 502, UE 115h transmits the uplink reference signal (e.g., SRS, DMRS, PTRS, etc.).

When UE 115a receives the CSI report configuration message containing the new TCI state associated with the new QCL type, UE 115a may sweep the available, candidate receive beams to measure the respective interference strength of the uplink reference signal transmitted at 502 via the identified uplink reference signal resource. UE 115a may also sweep the available, candidate receive beams to measure the respective signal power of the downlink reference signal (e.g., SSB or CSI-RS) transmitted at 501 via the identified downlink reference signal resource.

It should be noted that, in order to reduce the latency between UE 115a receiving the CSI report configuration message at 500 and transmitting the resulting CSI report at 605, UE 115a can store the measurement results in memory for future CSI reporting. Thus, after receiving a future CSI report configuration message that identifies the same or similar uplink and downlink reference signal resources, the measurements stored previously for those resources to determine the CSI for reporting.

At 503, UE 115a uses the measured signal powers of the downlink data and uplink interference signals in order to identify the corresponding receive beam that results in a highest SINR among the available, candidate receive beams. UE 115a would then use that selected receive beam to receive the downlink reference signal at 501 and the uplink reference signal at 502. At 504, UE 115a may then perform downlink channel estimation by using the receive beam for the downlink reference signal to derive the channel gain or channel matrix of the downlink reference signal resource. UE 115a may further, at 504, perform interference channel estimation by using the receive beam for the uplink reference signal to derive the interference strength or interference matrix of the uplink reference signal resource. It should be noted that, where interference information is configured (e.g. CSI-IM information and NZP-CSI-RS for interference information) in an aperiodic trigger state, UE 115a may derive the interference strength or covariance matrix by using the receive beam at the time-frequency resource for the configured CSI-IM and NZP-CSI-RS for interference resources. Based on the above results, UE 115a further calculates the SINR value and determine the CSI values at 504 (e.g., RI/PMI/CQI) for reporting to base station 105 at 505.

It should be noted that if multiple CSI-RS resources are configured, at 504, UE 115a would also determine a CSI-RS resource indicator (CRI) value to include with the CSI report to identify the particular CSI-RS resource used. UE 115a may then report the determined CSI values to base station 105 in a CSI report at 505.

Figure 6:
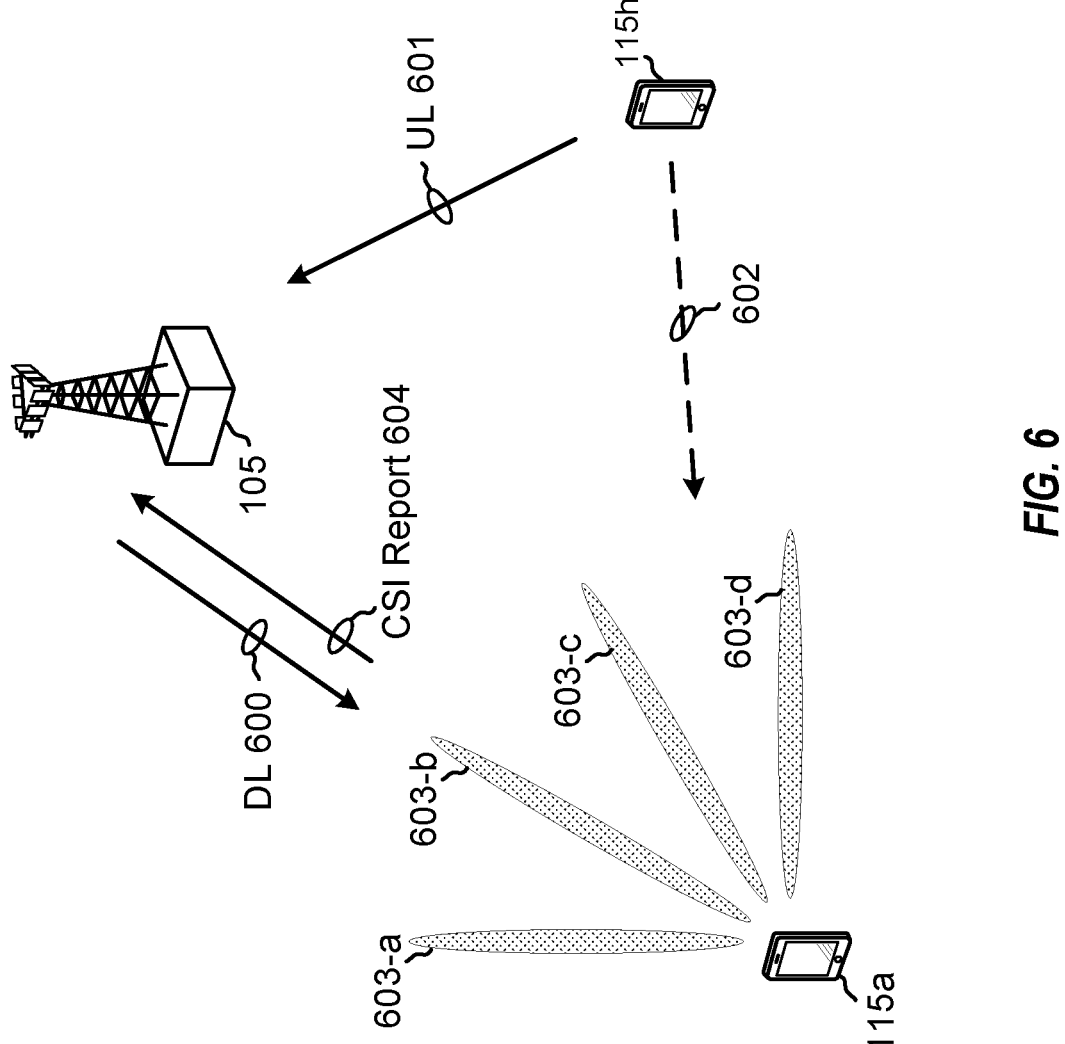
FIG. 6 is a block diagram illustrating a portion of a wireless communication network implementing for full-duplex capabilities according to one aspect of the present disclosure.

FIG. 6 is a block diagram illustrating a portion of a wireless communication network 60 implementing for full-duplex capabilities according to one aspect of the present disclosure. UE 115a receives downlink data from base station 105 via downlink transmission 600. Over the same set of time-frequency resources, base station 105 simultaneously receives uplink data from UE 115h via uplink transmission 601. Uplink transmission 601 causes interference 602 to UE 115a receiving downlink transmission 600. Base station 105 has provided CSI report configuration messaging to UE 115a that includes identification of a new TCI state which configures at least downlink reference signal resources and uplink reference signal resources. The new TCI state is associated with the new QCL assumption that includes a spatial relationship between the downlink and uplink reference signal resources.

As illustrated, UE 115a has four available candidate receive beams, receive beams 601-a-603-d. With the configuration of the downlink reference signal resource, the uplink reference signal resource, and the new QCL assumption, UE 115a sweeps through each of receive beams 603-a-603-d measuring the signal strength of a downlink reference signal transmitted via downlink transmission 600 and then measuring the signal strength of an uplink reference signal transmitted via uplink transmission 601. The resulting signal strength of the uplink reference signal represents the signal strength observed from interference 602. Using the measured signal strengths of the data channel (downlink transmission 600) and the interference channel (interference 602), UE 115a calculates a SINR for each of receive beams 603-a-603-d. Based on the calculated SINR for each candidate beam, UE 115a may select receive beam 603-b as the preferred receive beam. UE 115a would then use receive beam 603-b to receive and determine the CSI parameters (RI, PMI, CQI) to include in the CSI report. UE 115a will then transmit CSI Report 604 to base station 105.

According to the various aspects described herein, a downlink UE (e.g., the victim UE) can determine a suitable receive beam to generate and report CSI for full-duplex communications. By providing for this receive beam to be determined based on both a downlink reference signal resource and the interfering uplink reference signal resource, this receive beam can yield high SINR regarding the UE-to-UE interference caused by the described full-duplex operations. This may then improve the UE throughput and, more generally, the cell throughput of the full-duplex system.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. A first aspect of wireless communication may include receiving, at a UE, a CSI report configuration message including at least a TCI state and a QCL type indicator, wherein the TCI state includes identification of at least a downlink reference signal resource and an uplink reference signal resource and the QCL type indicator indicates a spatial relationship between the downlink reference signal resource and the uplink reference signal resource, determining, by the UE, a receive beam for receipt of a downlink reference signal via the downlink reference signal resource, wherein the receive beam is determined based on the QCL type indicator, determining, by the UE, CSI based on the receipt of the downlink reference signal using the receive beam and an interference measurement of the uplink reference signal resource, and transmitting, by the UE, a CSI report including the CSI to a serving base station.

A second aspect, based on the first aspect, wherein the receiving the CSI report configuration message includes one or more of: a RRC message; a MAC CE; and a DCI message.

A third aspect, based on the first aspect, wherein the determining the receive beam includes measuring an interference signal power of an uplink reference signal detected on the uplink reference signal resource; measuring a data signal power of the downlink reference signal detected on the downlink reference signal resource; determining a signal quality of a plurality of candidate receive beams, wherein the signal quality is determined using the data signal power and the interference signal power; and identifying the receive beam as a selected beam of the plurality of candidate receive beams, wherein the selected beam results in a highest signal quality relative to remaining beams of the plurality of candidate receive beams.

A fourth aspect, based on the third aspect, wherein the downlink reference signal includes one of: a CSI-RS; or a SSB, and wherein the uplink reference signal includes one of: a SRS; a DMRS; or a PTRS.

A fifth aspect, based on the third aspect, further including: storing, at the UE, at least one of the interference signal power and the data signal power; and using, by the UE, the at least one of the stored interference signal power and the stored data signal power for subsequent CSI reporting.

A sixth aspect, based on the first aspect, wherein the determining the CSI includes: determining a first channel estimate using the receive beam for the downlink reference signal; deriving a data channel power using the first channel estimate; determining a second channel estimate using the receive beam for an uplink reference signal on the uplink reference signal resource; deriving an interference channel strength using the second channel estimate; and calculating the CSI based on the data channel power and the interference channel strength.

A seventh aspect, based on the sixth aspect, wherein the CSI report configuration message further includes identification of CSI-IM resources and NZP-CSI-RS resources for aperiodic CSI reporting, and wherein the determining the second channel estimate includes determining the second channel estimate using the receive beam for the CSI-IM resources and the NZP-CSI-RS resources.

An eighth aspect, based on the sixth aspect, further including identifying a CSI-RS resource of a plurality of CSI-RS resources on which the downlink reference signal is received, wherein the downlink reference signal resource includes configuration of a plurality of CSI-RS resources, and wherein the CSI report further includes a CRI identifying the CSI-RS resource.

A ninth aspect, based on the first aspect, further including detecting, by the UE, an uplink reference signal from a neighboring UE, wherein the uplink reference signal is detected via the uplink reference signal resource identified in the CSI report configuration message.

A tenth aspect including any combination of the first aspect through the ninth aspect.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
receiving, at a user equipment (UE), a channel state information (CSI) report configuration message including at least a transmission configuration indicator (TCI) state and a quasi-colocation (QCL) type indicator, wherein the TCI state includes identification of at least a downlink reference signal resource and an uplink reference signal resource and the QCL type indicator indicates a spatial relationship between the downlink reference signal resource and the uplink reference signal resource;
determining, by the UE, a receive beam for receipt of a downlink reference signal via the downlink reference signal resource, wherein the receive beam is determined in accordance with the spatial relationship between the downlink reference signal resource and the uplink reference signal resource indicated in the QCL type indicator;

determining, by the UE, CSI based on the receipt of the downlink reference signal using the receive beam and an interference measurement of the uplink reference signal resource; and
transmitting, by the UE, a CSI report including the CSI to a serving base station.

2. The method of claim 1, wherein the CSI report configuration message includes one or more of:
a radio resource control (RRC) message;
a medium access control control element (MAC CE); or
a downlink control information (DCI) message.

3. The method of claim 1, wherein the determining the receive beam includes:
measuring an interference signal power of an uplink reference signal detected on the uplink reference signal resource;
measuring a data signal power of the downlink reference signal detected on the downlink reference signal resource;
determining a signal quality of a plurality of candidate receive beams, wherein the signal quality is determined using the data signal power and the interference signal power; and
identifying the receive beam as a selected beam of the plurality of candidate receive beams, wherein the selected beam results in a highest signal quality relative to remaining beams of the plurality of candidate receive beams.

4. The method of claim 3,
wherein the downlink reference signal includes one of:
a CSI-reference signal (CSI-RS); or
a synchronization signal block (SSB), and
wherein the uplink reference signal includes one of:
a sounding reference signal (SRS);
a demodulation reference signal (DMRS); or
a phase tracking reference signal (PTRS).

5. The method of claim 3, further including:
storing, at the UE, at least one of the interference signal power and the data signal power; and
using, by the UE, the at least one of the stored interference signal power and the stored data signal power for subsequent CSI reporting.

6. The method of claim 1, wherein the determining the CSI includes:
determining a first channel estimate using the receive beam for the downlink reference signal;
deriving a data channel power using the first channel estimate;
determining a second channel estimate using the receive beam for an uplink reference signal on the uplink reference signal resource;
deriving an interference channel strength using the second channel estimate; and
calculating the CSI based on the data channel power and the interference channel strength.

7. The method of claim 6,
wherein the CSI report configuration message further includes identification of CSI-interference measurement (CSI-IM) resources and non-zero power CSI reference signal (NZP-CSI-RS) resources for aperiodic CSI reporting, and
wherein the determining the second channel estimate includes determining the second channel estimate using the receive beam for the CSI-IM resources and the NZP-CSI-RS resources.

8. The method of claim 6, further including:

identifying a CSI-reference signal (CSI-RS) resource of a plurality of CSI-RS resources on which the downlink reference signal is received, wherein the downlink reference signal resource includes configuration of a plurality of CSI-RS resources, and wherein the CSI report further includes a CSI-RS resource indicator (CRI) identifying the CSI-RS resource.

9. The method of claim 1, further including:

detecting, by the UE, an uplink reference signal from a neighboring UE, wherein the uplink reference signal is detected via the uplink reference signal resource identified in the CSI report configuration message.

10. A non-transitory computer-readable medium having program code recorded thereon, the program code comprising:

program code executable by a computer for causing the computer to receive, at a user equipment (UE), a channel state information (CSI) report configuration message including at least a transmission configuration indicator (TCI) state and a quasi-colocation (QCL) type indicator, wherein the TCI state includes identification of at least a downlink reference signal resource and an uplink reference signal resource and the QCL type indicator indicates a spatial relationship between the downlink reference signal resource and the uplink reference signal resource;

program code executable by the computer for causing the computer to determine, by the UE, a receive beam for receipt of a downlink reference signal via the downlink reference signal resource, wherein the receive beam is determined in accordance with the spatial relationship between the downlink reference signal resource and the uplink reference signal resource indicated in the QCL type indicator;

program code executable by the computer for causing the computer to determine, by the UE, CSI based on the receipt of the downlink reference signal using the receive beam and an interference measurement of the uplink reference signal resource; and program code executable by the computer for causing the computer to transmit, by the UE, a CSI report including the CSI to a serving base station.

11. The non-transitory computer-readable medium of claim 10, wherein the CSI report configuration message includes one or more of:

a radio resource control (RRC) message;

a medium access control control element (MAC CE); or a downlink control information (DCI) message.

12. The non-transitory computer-readable medium of claim 10, wherein the program code executable by the computer for causing the computer to determine the receive beam includes:

program code executable by the computer for causing the computer to measure an interference signal power of an uplink reference signal detected on the uplink reference signal resource;

program code executable by the computer for causing the computer to measure a data signal power of the downlink reference signal detected on the downlink reference signal resource;

program code executable by the computer for causing the computer to determine a signal quality of a plurality of candidate receive beams, wherein the signal quality is determined using the data signal power and the interference signal power; and program code executable by the computer for causing the computer to identify the receive beam as a selected beam of the plurality of candidate receive beams, wherein the selected beam results in a highest signal quality relative to remaining beams of the plurality of candidate receive beams.

13. The non-transitory computer-readable medium of claim 12, wherein the downlink reference signal includes one of:

a CSI-reference signal (CSI-RS); or a synchronization signal block (SSB), and wherein the uplink reference signal includes one of:

a sounding reference signal (SRS);

a demodulation reference signal (DMRS); or a phase tracking reference signal (PTRS).

14. The non-transitory computer-readable medium of claim 12, further including:

program code executable by the computer for causing the computer to store, at the UE, at least one of the interference signal power and the data signal power; and program code executable by the computer for causing the computer to use, by the UE, the at least one of the stored interference signal power and the stored data signal power for subsequent CSI reporting.

15. The non-transitory computer-readable medium of claim 10, wherein the program code executable by the computer for causing the computer to determine the CSI includes:

program code executable by the computer for causing the computer to determine a first channel estimate using the receive beam for the downlink reference signal;

program code executable by the computer for causing the computer to derive a data channel power using the first channel estimate;

program code executable by the computer for causing the computer to determine a second channel estimate using the receive beam for an uplink reference signal on the uplink reference signal resource;

program code executable by the computer for causing the computer to derive an interference channel strength using the second channel estimate; and program code executable by the computer for causing the computer to calculate the CSI based on the data channel power and the interference channel strength.

16. The non-transitory computer-readable medium of claim 15, wherein the CSI report configuration message further includes identification of CSI-interference measurement (CSI-IM) resources and non-zero power CSI reference signal (NZP-CSI-RS) resources for aperiodic CSI reporting, and wherein the program code executable by the computer for causing the computer to determine the second channel estimate includes program code executable by the computer for causing the computer to determine the second channel estimate using the receive beam for the CSI-IM resources and the NZP-CSI-RS resources.

17. The non-transitory computer-readable medium of claim 15, further including:

program code executable by the computer for causing the computer to identify a CSI-reference signal (CSI-RS) resource of a plurality of CSI-RS resources on which the downlink reference signal is received, wherein the downlink reference signal resource includes configuration of a plurality of CSI-RS resources, and wherein the CSI report further includes a CSI-RS resource indicator (CRI) identifying the CSI-RS resource.

18. The non-transitory computer-readable medium of claim 10, further including:

program code executable by the computer for causing the computer to detect, by the UE, an uplink reference signal from a neighboring UE, wherein the uplink reference signal is detected via the uplink reference signal resource identified in the CSI report configuration message.

19. An apparatus configured for wireless communication, the apparatus comprising:

at least one processor; and a memory coupled to the at least one processor, wherein the at least one processor is configured:

to receive, at a user equipment (UE), a channel state information (CSI) report configuration message including at least a transmission configuration indicator (TCI) state and a quasi-colocation (QCL) type indicator, wherein the TCI state includes identification of at least a downlink reference signal resource and an uplink reference signal resource and the QCL type indicator indicates a spatial relationship between the downlink reference signal resource and the uplink reference signal resource;

to determine, by the UE, a receive beam for receipt of a downlink reference signal via the downlink reference signal resource, wherein the receive beam is determined in accordance with the spatial relationship between the downlink reference signal resource and the uplink reference signal resource indicated in the QCL type indicator;

to determine, by the UE, CSI the receipt of the downlink reference signal using the receive beam and an interference measurement of the uplink reference signal resource; and to transmit, by the UE, a CSI report including the CSI to a serving base station.

20. The apparatus of claim 19, wherein the CSI report configuration message includes one or more of:

a radio resource control (RRC) message;

a medium access control control element (MAC CE); or a downlink control information (DCI) message.

21. The apparatus of claim 19, wherein the configuration of the at least one processor to determine the receive beam includes configuration of the at least one processor:

to measure an interference signal power of an uplink reference signal detected on the uplink reference signal resource;

to measure a data signal power of the downlink reference signal detected on the downlink reference signal resource;

to determine a signal quality of a plurality of candidate receive beams, wherein the signal quality is determined using the data signal power and the interference signal power; and to identify the receive beam as a selected beam of the plurality of candidate receive beams, wherein the selected beam results in a highest signal quality relative to remaining beams of the plurality of candidate receive beams.

22. The apparatus of claim 21, wherein the downlink reference signal includes one of:

a CSI-reference signal (CSI-RS); or a synchronization signal block (SSB), and wherein the uplink reference signal includes one of:

a sounding reference signal (SRS);

a demodulation reference signal (DMRS); or a phase tracking reference signal (PTRS).

23. The apparatus of claim 21, further including configuration of the at least one processor:

to store, at the UE, at least one of the interference signal power and the data signal power; and to use, by the UE, the at least one of the stored interference signal power and the stored data signal power for subsequent CSI reporting.

24. The apparatus of claim 19, wherein the configuration of the at least one processor to determine the CSI includes configuration of the at least one processor:

to determine a first channel estimate using the receive beam for the downlink reference signal;

to derive a data channel power using the first channel estimate;

to determine a second channel estimate using the receive beam for an uplink reference signal on the uplink reference signal resource;

to derive an interference channel strength using the second channel estimate; and to calculate the CSI based on the data channel power and the interference channel strength.

25. The apparatus of claim 24, wherein the CSI report configuration message further includes identification of CSI-interference measurement (CSI-IM) resources and non-zero power CSI reference signal (NZP-CSI-RS) resources for aperiodic CSI reporting, and wherein the configuration of the at least one processor to determine the second channel estimate includes configuration of the at least one processor to determine the second channel estimate using the receive beam for the CSI-IM resources and the NZP-CSI-RS resources.

26. The apparatus of claim 24, further including configuration of the at least one processor to identify a CSI-reference signal (CSI-RS) resource of a plurality of CSI-RS resources on which the downlink reference signal is received, wherein the downlink reference signal resource includes configuration of a plurality of CSI-RS resources, and wherein the CSI report further includes a CSI-RS resource indicator (CRI) identifying the CSI-RS resource.

27. The apparatus of claim 19, further including configuration of the at least one processor to detect, by the UE, an uplink reference signal from a neighboring UE, wherein the uplink reference signal is detected via the uplink reference signal resource identified in the CSI report configuration message.

* * * * *